United States Patent [19]

Grasso

[11] Patent Number: 5,060,392
[45] Date of Patent: Oct. 29, 1991

[54] NORTH FINDING SYSTEM

[75] Inventor: Mark S. Grasso, Whippany, N.J.

[73] Assignee: Allied-Signal Inc., Morris Township, Morris County, N.J.

[21] Appl. No.: 549,843

[22] Filed: Jul. 9, 1990

[51] Int. Cl.$^5$ .............................................. G01C 19/38
[52] U.S. Cl. .................................... 33/324; 33/318; 33/321
[58] Field of Search ........................... 33/321, 318, 324

[56] References Cited

U.S. PATENT DOCUMENTS 4,461,089 7/1984 Krogmann ............................ 33/324
4,686,771 8/1987 Beveventano et al. ............... 33/324

Primary Examiner—Harry N. Haroian
Attorney, Agent, or Firm—Howard G. Massung; Robert A. Walsh

[57] ABSTRACT

A gyrocompassing system intended for land based equipment requiring north reference information includes a novel gyrocompass implementation which enables utilization of high grade inertial sensors while achieving the desired goal of moderate cost. The north finding system is designed to provide high accuracy with fast reaction time over a wide temperature range without the aid of heaters and other auxiliary equipment. The arrangement is specifically configured to tolerate settling and/or oscillatory base motion without additional reaction time or degradation of gyrocompassing accuracy. The input axis of a gyroscope used in the system is skewed, so it can measure a component of gimbal rotation, thereby eliminating the need for independently measuring the relative gimbal angle. Absolute position alignment between the gimbal and the system case as is required is accomplished by an appropriate stop arrangement, which is an easier task than measuring the relative gimbal angle as aforenoted.

16 Claims, 4 Drawing Sheets

EARTH'S RATE
HORIZONTAL AND VERTICAL COMPONENTS

EARTH'S RATE
HORIZONTAL COMPONENTS

NORTH FINDING SYSTEM

BACKGROUND OF THE INVENTION

This invention relates to a north finding system implemented as gyrocompassing apparatus intended for use on ground based equipment such as antenna pedestals, projectile launchers, and like equipment requiring north reference information. The gyrocompassing implementation enables utilization of high grade state-of-the-art inertial sensors and yet achieves the desired results economically. The north finding system provides high accuracy with fast reaction time over a wide temperature range without the need for auxiliary equipment such as heaters or the like. The system is specifically configured to tolerate settling and/or oscillatory base motion without additional reaction time or degradation of gyrocompassing accuracy, as is the case with prior art north finding systems. This feature is important in applications where host equipment base settling, personnel movement, and wind factors for example, impose a dynamic gyrocompassing environment.

One relatively low cost configuration considered for a north finding system for the purposes required features a strapdown package using a conventional single spinning wheel gyroscope (gyro). While such an arrangement is adequate with small tilt angles and with no base motion, or with a relatively non-stringent gyrocompassing. accuracy, it suffers from temperature sensitive mass unbalance effects which cause apparent gyro bias shifts for each specific combination of temperature and tilt. Without temperature control, which adds to the complexity of the apparatus, only a few degrees of deviation from the reference causes gyrocompassing errors which are unacceptable for the purposes intended. Further, this temperature sensitivity of rotating mass gyros affects both accuracy and reaction time. Accordingly, an important feature of the present invention is that it is virtually temperature insensitive and exhibits no mass unbalance effects.

Ground based installations for which the present invention is intended have a tendency to settle when emplaced. Settling can be caused either by a slow sinking of a vehicle or other structure into the terrain, or by the suspension system supporting the installation compressing from its running state. Any sensed angular rate contaminates the earth rate reading which a strapdown gyro measures to find north. A relatively small settling rate can cause a substantial gyrocompassing error which is magnified at higher latitudes. Accordingly, high performance accelerometers coupled with a sophisticated software program have been used to compensate for the settling angle.

Rotational vibration creates another problem observed in some north seeking arrangements. This problem can be obviated by using a ring laser gyro with a high bandwidth and low quantization, which allows accurate motion reconstruction during high angular rate movements to permit the ring laser gyro read-out electronics to operate at relatively high angular rates.

It should also be noted that lateral vibrational inputs measured by accelerometers used to compensate gyro outputs do not present a problem. These varying measurements average to an acceptable level over a period of time. Another advantage of arrangements of the type described is the virtually instant turn on time, independent of temperature. Thus, these arrangements have been observed to be ready only three seconds after applying power, thereby allowing a longer gyrocompassing average time then conventional arrangements which take much longer to reach operational steady state spin rate and specified accuracy.

A properly designed three gimbal platform arrangement, constructed around spinning wheel inertial rate gyros which are levelled, may serve the purposes intended. In an arrangement of this type the levelled platform isolates the north seeking gyro from tilt and rotational movements. The arrangement disclosed in commonly assigned U.S. Pat. No. 4,686,771 issued on Aug. 18, 1987 to Thomas Beneventano, et al, also serves the purposes intended. However, other arrangements have been found to be more desirable than that taught by the prior art as aforenoted. One such arrangement is disclosed in commonly assigned co-pending U.S. application Ser. No. 327,874 filed on Mar. 23, 1987 by Thomas Beneventan now U.S. Pat. No. 4,945,647. This arrangement requires independent means for measuring the relative gimbal angle and a resolver system is used for that purpose. The present invention is an improvement over that disclosed in the aforenoted application in that the need for independently measuring the relative gimbal angle is eliminated. This is accomplished by skewing the input axis of the gyro. In this regard, note that during gimbal rotation a component of said rotation is applied to the gyro input axis. Absolute position alignment between the gyro gimbal and case is required, but this is an easier task than measuring the relative gimbal angle as has heretofore been necessary.

SUMMARY OF THE INVENTION

This invention contemplates a north finding system including a platform module, a control and display unit and system electronics. The platform module is configured as a platform including inertial instruments mounted on a gimbal for implementing gyrocompass indexing positions. The system electronics include gyro support electronics, a microprocessor and indexing circuitry, all of which provide the required control, compensation, computation and interface functions.

The platform gimbal provides a capability for indexing the inertial instruments to the various positions required for gyrocompassing. The gimbal is driven by a torquer to provide drive capability. A gimbal lock which otherwise functions to strap down the platform is energized (released) to allow gimbal rotation.

Gyrocompassing information is collected with the gimbal in the locked state. A gyro, which in the preferred embodiment of the invention is a ring laser gyro, measures earth's rate during gyrocompassing. When the gimbal is unlocked and is rotated, relative gimbal angular displacement is measured by the gyro. Accelerometers are used to measure gyro tilt and host equipment and base motion in the gyrocompassing implementation.

The system electronics provides microprocessor control of the indexing gimbal. Gimbal lock drive electronics is activated for releasing the gimbal for indexing and deactivated for re-locking the gimbal. Torquer drive electronics energizes the gimbal torquer in response to gimbal rotating commands. Absolute alignment of the gimbal to platform module mounting pads as is necessary is implemented via a suitable stop device.

The system electronics also include a DC/DC power converter which accepts an unregulated 28 volt DC external input, and produces the required regulated DC voltages. An electromagnetic interference filter included in the converter insures electromagnetic compatibility.

The control and display unit, in addition to a key pad for input to the platform module, also has an integrally mounted display capability. The display is controlled by the microprocessor and is energized via a display driver. Besides displaying north references, roll and cross-roll information is presented.

Operationally, the platform module senses earth's rate and gravity along with base motion. Output data from the platform, appropriately conditioned and digitized by the system electronics, is applied to the microprocessor. Initial software processing of the platform data compensates for various gyro and accelerometer parameters. The software processing also provides the electronics with reference values for proper ring laser pathlength and dither control of the ring laser gyro. The aforenoted stop determines proper positioning of the platform for gyrocompassing. The software initiates the indexing commands which control the gimbal lock and torque drives. After compensation, the gyro and accelerometer data is operated on by software algorithms to obtain best estimates of rate and tilt information prior to performing gyrocompass and tilt computations. Interface functions for remote operation of the platform module are under software control, and software also controls outputs to the control and display unit and accepts control and display unit key pad inputs for local operation of the system.

DETAILED DESCRIPTION OF THE INVENTION

Figure 1:
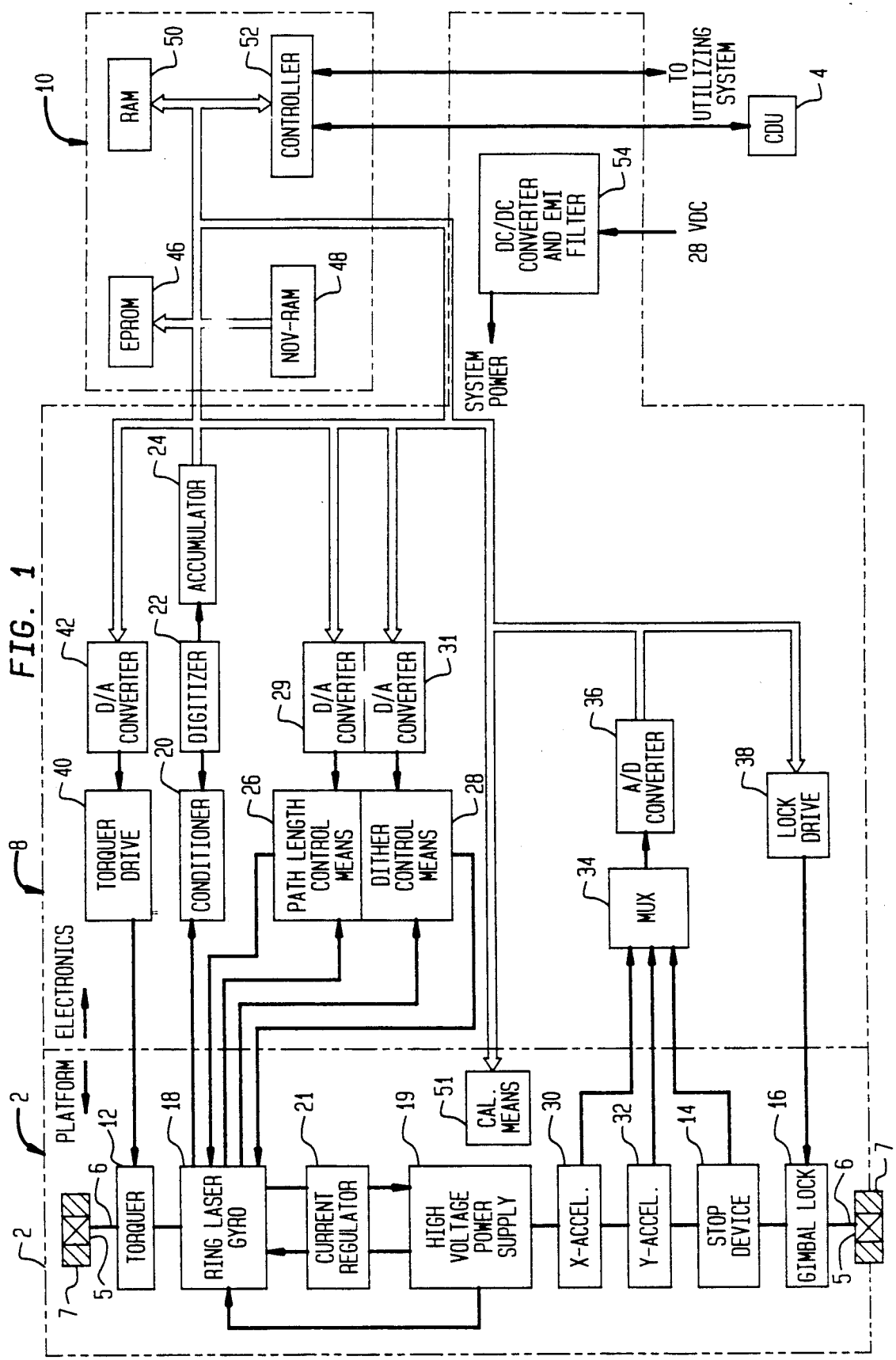
FIG. 1 is a functional block diagram of a north finding system in accordance with the invention.

With reference to FIG. 1 a platform module is designated generally by the numeral 2 and a control and display unit (CDU) is designated generally by the numeral 4. Platform module 2 includes the several inertial instruments of the system which are mounted on a gimbal 6. Gimbal 6 is utilized to implement gyrocompassing indexing positions as will hereinafter be explained.

North finding system electronics is designated generally by the numeral 8 and includes gyro support circuitry and gimbal indexing circuitry. A microprocessor is designated generally by the numeral 10. System electronics 8 and microprocessor 10 provide the required control, compensation, computation and interface functions for the system.

Gimbal 6 rotatably supported by bearings 5 in a case or housing 7, provides the capability for indexing the several inertial instruments for gyrocompassing. Gimbal 6 supports a torquer 12 to provide a drive capability, a stop device 14 and a gimbal lock 16 which is energized to allow rotation or indexing of gimbal 6 but is otherwise locked to "strap down" the platform module.

In the aforenoted co-pending U.S. application Ser. No. 327,874, independent means are provided for measuring the relative gimbal angle, and a resolver arrangement was used for this purpose. The configuration of the present invention eliminates the need for such means as will hereinafter become evident. However, it is still necessary to maintain absolute position alignment between gimbal 6 and case 7 and stop device 14 is used for this purpose. Stop device 14 may be a mechanical stop arrangement, an optical arrangement or a magnetic pick up. In any event, such a stop device is much easier to implement than the aforementioned independent measuring means as will be readily understood.

Gyrocompassing data is collected with gimbal 6 locked, i.e. lock 16 de-energized and unlocked, i.e. lock 16 energized. A gyroscope (gyro) 18, which in the preferred embodiment of the invention is a ring laser gyro, measures rate about its input axis and provides a fringe rate signal that is a frequency modulated analog signal with a frequency proportional to rotational rate. This signal is conditioned, digitized and accumulated via conditioner 20, digitizer 22 and accumulator 24 for software processing. Ring laser gyro 18 provides laser beam intensity signals and dither instantaneous amplitude signals. These signals are processed via pathlength control means 26 and dither control means 28 which are controlled by microprocessor 10 via D/A converters 29 and 31, respectively, as indicated in FIG. 1. Ring laser gyro 18 is powered by a high voltage power supply 19 via a current regulator 21.

X-accelerometer 30 and Y-accelerometer 32 mounted on gimbal 6 are used to measure the tilt of gyro 18 and to measure host equipment base motion in the gyrocompassing implementation. Outputs provided by accelerometers 30 and 32 are analog DC voltages which are multiplexed via a multiplexer (MUX) 34 and digitized via an A/D converter 36, and thereafter applied to microprocessor 10. If stop device 14 is other than a mechanical stop as aforenoted, an output is provided by the stop device which is likewise multiplexed via multiplexer 34, digitized via A/D converter 36 and thereafter applied to microprocessor 10. Alternatively, a separate A/D converter can be used for the output from stop device 14 as will now be understood by those skilled in the art. In another embodiment of the invention, these voltages are processed by voltage to frequency (V/F) converters, and thereafter applied to microprocessor 10.

System electronics 8 provides microprocessor control of gimbal 6 as aforenoted. A lock drive 38 is activated by microprocessor 10 to release gimbal 6 for rotation and is de-activated by the microprocessor for re-locking the gimbal.

A torquer drive 40 energizes torquer 12 in response to torquer commands provided by microprocessor 10 via a D/A converter 42 to index gimbal 6.

Microprocessor 10 is of the type which uses a conventional MIL-STD-1750A based chip and a complement of peripherals. Memory is comprised of an EPROM module 46, a NOVRAM module 48 and a RAM module 50. A NOVRAM calibration means 51 is utilized for storage of inertial instrument and alignment calibration constants and permits updating of these parameters when required. A dual serial communications controller 52 provides a serial link on one channel for remote communication with a utilizing system computer (not otherwise shown). A second channel is utilized for CDU local operation.

Systems electronics 8 includes a DC/DC converter 54 with an electromagnetic interference (EMI) filter to assure electromagnetic compatibility.

In regard to control and display unit (CDU) 4, in addition to a key pad for inputting to platform 2, a control and display unit housing has an integrally mounted display capability. The display is controlled by microprocessor 10 and energized by a display driver (not otherwise shown). Besides displaying north reference, roll and cross-roll information is also displayed. Only as much of control and display unit 4 as is necessary to understand its function in relation to the invention has been herein described, the same being now understood by those skilled in the art.

Figure 2:
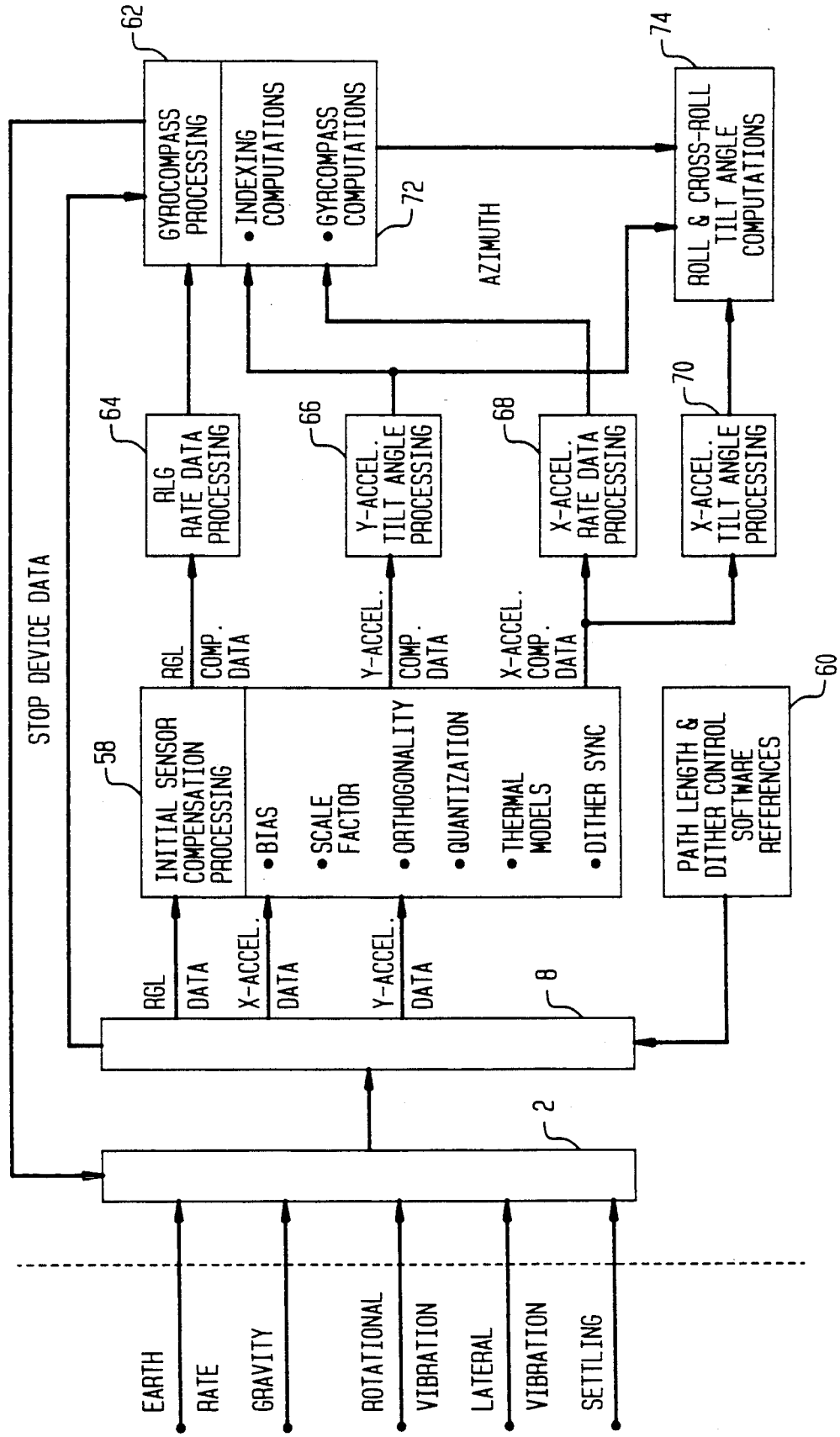
FIG. 2 is a block diagram outlining the north finding system software functions.

With reference to FIG. 2, platform module 2 senses earth's rate and gravity along with base motion parameters including rotational vibration, lateral vibration and settling. Output data from the platform module is appropriately conditioned and digitized by system electronics 8 and is applied to microprocessor 10 (FIG. 1). Thus, data from ring laser gyro (RLG) 18, X-accelerometer 30 and Y-accelerometer 32 are processed to compensate for various gyro and accelerometer parameters including bias, scale factor, orthogonality, quantization, thermal models, and dither synchronization by a software module 58. A software module 60 provides system electronics 8 with the reference values for proper pathlength and dither control of ring laser gyro 18.

Data from stop device 14 is applied to a software module 62 for determining proper positioning of gimbal 6 for gyrocompassing. Module 62 initiates the indexing commands which control pivot lock 16 and torquer drive 40. In this connection, it will be understood that if stop device 14 is a mechanical stop arrangement it is not necessary to apply data from the stop device to software module 62. The application of such data is necessary if stop device 14 is an optical or magnetic pick-up arrangement as aforenoted, as will now be understood by those skilled in the art.

After suitable compensation and processing by modules 64, 66, 68 and 70, gyro and accelerometer data are operated on by software algorithms to obtain best estimates of rate and tilt information prior to performing gyrocompass and tilt computations via software modules 72 and 74. Software module 72 includes the base motion compensation algorithms.

Figure 3A:
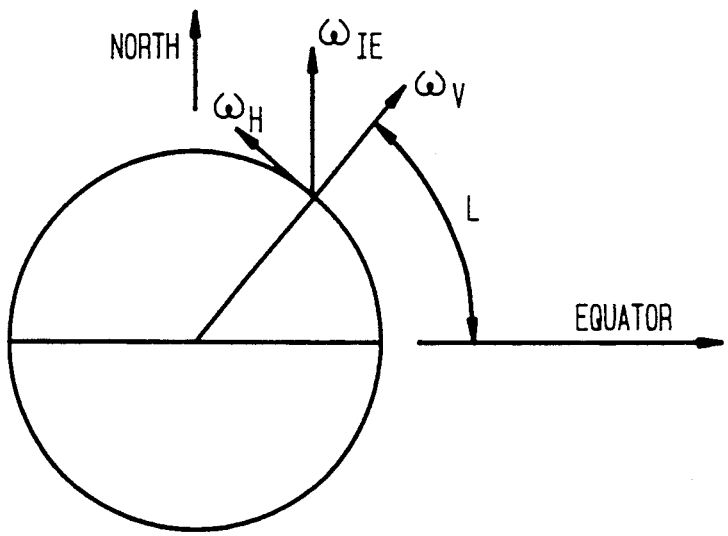
FIGS. 3A and 3B are diagrammatic representations illustrating the objective of gyrocompassing, i.e. to determine the angle from true north of the forward direction of the north finding system.
Figure 3B:
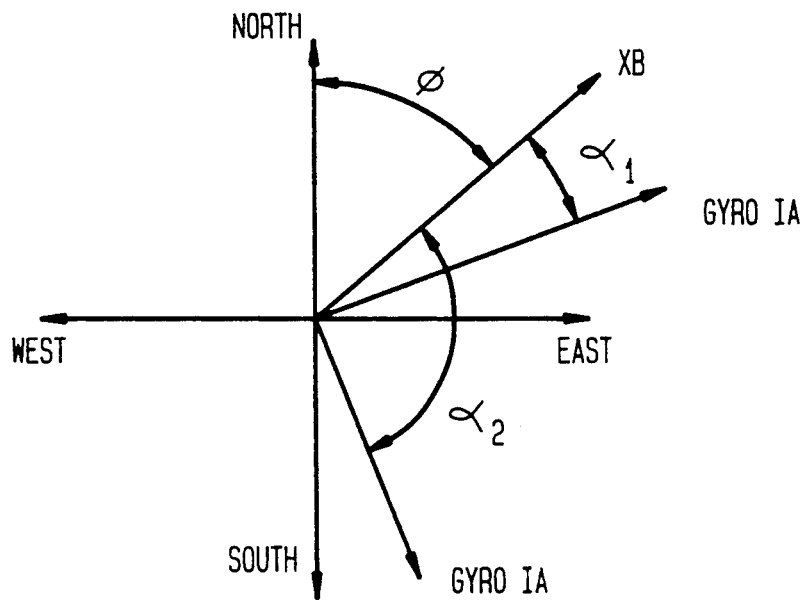

FIG. 3A shows both the horizontal and vertical components of Earth's rate and the relation of the components to latitude (L). It will be recognized that the objective of gyrocompassing is to determine the angle from true North ($\psi$) of the forward direction of platform module 2 (XB). FIG. 3B shows XB, $\psi$, $\alpha$ and gyro input axis IA.

With reference to FIGS. 3A and 3B, a gyro measures the component of inertial rotational rate about its case-fixed input axis IA. In the present case, the gyro takes two rotational rate measurements in order to accurately determine the direction of the spin vector of the earth. Of course, this vector is the earth's North-South axis.

If platform case 7 is level (its XY plane is tangential to the earth's surface), the gyro IA is then at a known angle from a level plane. In this event, the gyro readings will provide the data necessary to determine heading. If case 7 is not level, it is still possible to determine heading by taking tilt into account. Tilt is measured by accelerometers 30 and 32 mounted along two orthogonal axes in the platform XY plane.

With continued reference to FIGS. 3A and 3B, at any point on the earth, the earth's spin vector has a component tangential to the earth's surface (known as the horizontal component of earth's rate, $\omega$ h) and another component normal to the surface (known as the vertical component of earth's rate $\omega$ v). For a spherical earth, $\omega$ h and $\Omega$ v are functions of latitude only, and are given by:

$$\omega h = \omega IE \cos L, \text{ and}$$

$$\omega v = \omega IE \sin L,$$

where $\omega$ IE is the total magnitude of the earth's rotational rate 15.041 degrees/hour) and L is latitude as aforenoted. Conveniently, $\omega$ h always locally points North, so the platform calculates heading as the angle between h and the horizontal projection of the platform X axis.

The arrangement disclosed in the aforenoted U.S. patent application Ser. No. 327,874 uses a single gyro mounted so the input axis of the gyro can rotate to any direction in the XY plane of the platform. When the platform case is level, the gyro IA is kept in a level plane, and is only subject to components of $\omega$ h.

Figure 4:
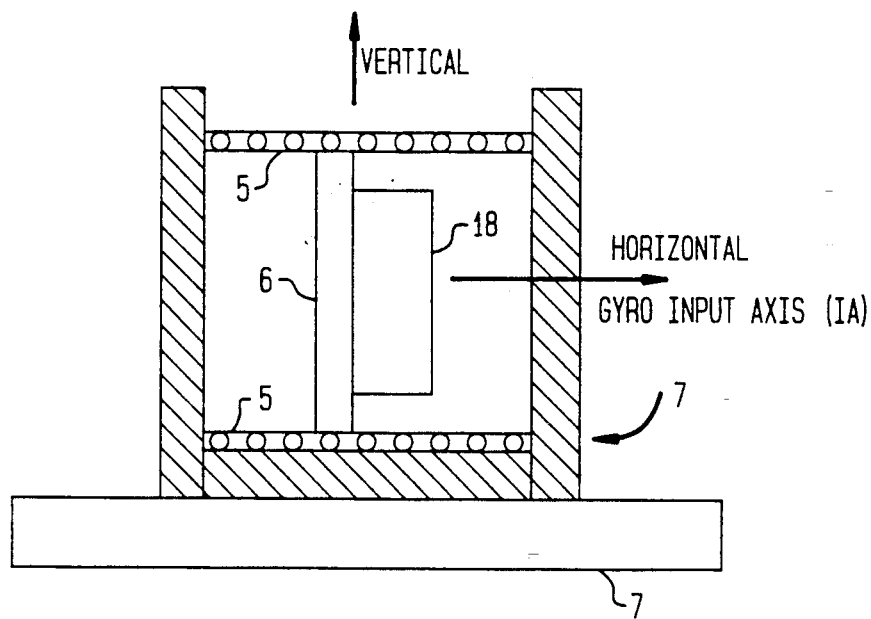
FIG. 4 is a diagrammatic representation illustrating the prior art gyro orientation.

FIG. 4 shows this prior art implementation with the gyro input axis in a horizontal plane and the gimbal rotation axis vertical. Minor platform tilts are measured by accelerometers 30, 32. The accelerometer data is used to correct the gyro data $\omega$ g, as heretofore discussed with reference to FIG. 2 and explained in detail in the aforenoted U.S. patent application Ser. No. 327,874, said explanation being incorporated herein by reference.

Under these conditions, the rate sensed by gyro 18 is expressed as follows:

$$\omega g = \omega h \cos (\psi + \alpha). \tag{1}$$

When gimbal 6 is locked and held fixed to case 7, accelerometer and gyro data are recorded. Since $\omega$ h and $\alpha$ are known, $\pm \psi$ is determined. In order to determine the sign of $\psi$, the gimbal must be rotated to $\alpha$ 2 (FIG. 3B). Any angle of rotation suffices, but 90 degrees will give the least error. The gimbal is locked at $\alpha 2$ and data is recorded. The sign of $\alpha 2$ can then be determined.

Figure 5:
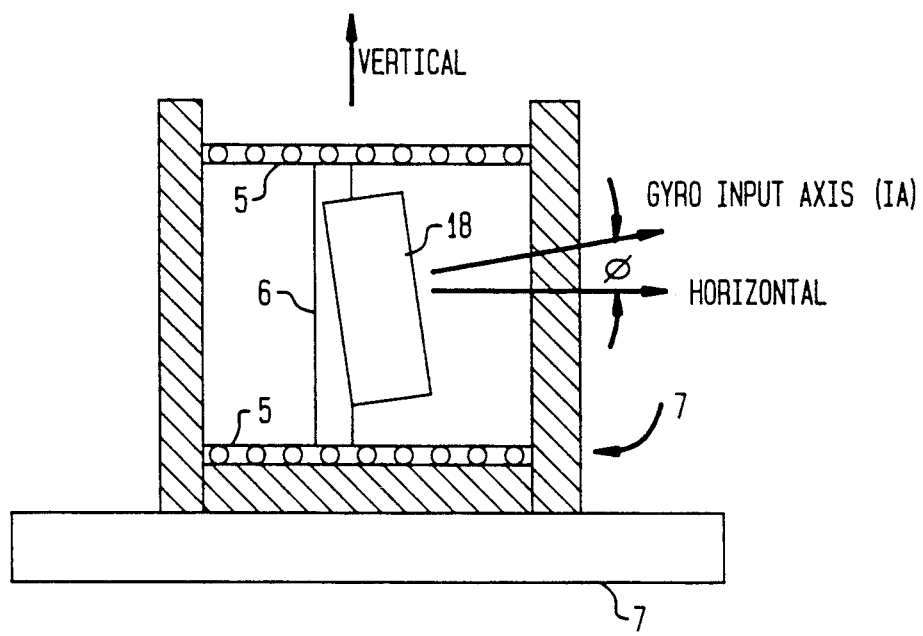
FIG. 5 is a diagrammatic representation illustrating the gyro orientation of the present invention.

In the present invention as shown in FIG. 5, gyro 18 is orientated so that the gyro IA is no longer in the horizontal plane. The gyro IA is tilted by an angle $\phi$ from horizontal. This changes equation (1) to:

$$\omega g = \omega h \cos (\psi + \alpha) \cos (\phi) = \omega v \sin (\phi). \tag{2}$$

When gimbal 6 is locked, the procedure is identical to that disclosed in the aforementioned co-pending U.S. patent application, i.e. measure $\omega g$ and calculate $\psi$. The difference occurs when the gimbal is released and rotated from $\alpha$ 1 to $\alpha$ 2 (FIG. 3B). During this time the output of gyro 18 is:

$$\omega g = \omega \cos(\psi + \alpha) \cos (\phi) = (\omega v = \omega p) \sin (\phi), \tag{3}$$

where $\omega$ p is the rotational rate of the gimbal from $\alpha$ 1 to $\alpha$ 2. By collecting data during this rotation, the angle rotated can be determined. By using a stop device 14 (FIG. 1), $\alpha$ 1 will be defined with respect to XB, and the absolute gimbal position is maintained. While locked at $\alpha$ 1, $\omega$ g will be measured. With this information, $\pm \psi$ can be determined. Then the gimbal lock will be released, and the torquer will be used to rotate the gimbal. As this is being done, $\omega g$ can be integrated to determine angle $\theta$ through which the gimbal is rotated:

$$\theta = \int \omega g \, dt. \quad (4)$$

Substituting (3) into (4):

$$\theta = \int (\omega P \sin (\phi) + \omega h \cos (\psi + \alpha) \cos (\phi) + \omega v \sin (\phi)) \, dt. \quad (5)$$

Equation (5) can be rewritten as follows:

$$\theta = (\omega p + \omega v) \sin (\phi) t = \int \omega h \cos (\psi + \alpha) \cos (\phi) dt. \quad (6)$$

The problem is that since the sign of $\psi$ is not known at this point, the integral in equation (6) cannot be evaluated. Since gimbal 6 does not have to be turned exactly 90 degrees this does not present a problem. The integral in equation (6) is small compared to the first term of the equation and can be neglected. The gimbal is locked when $\theta \cong 90$ degrees and $\omega g$ is measured. With this information, the sign of $\psi$ can be determined and the integral in equation (6) can be evaluated exactly. Since:

$$\alpha 2 = \theta + \alpha 1 \quad (7)$$

the value of $\alpha$ 2 can be calculated. This shows that the gimbal angle can be determined by using the gyro output without the need for a separate resolver or encoder on gimbal 6 as has heretofore been required.

Thus, the herein disclosed invention is an improvement over the prior art in that the need for independently measuring the relative gimbal angle is eliminated by skewing the input axis of the gyro. While absolute position alignment between the gyro gimbal and case is required, this is accomplished by an appropriate stop arrangement which is an easier task than the aforenoted gimbal angle measurement.

With the above description of the invention in mind, reference is made to the claims appended hereto for a definition of the scope of the invention.

What is claimed is:

1. A north finding system of the type mounted to ground based equipment for providing a north reference for said equipment, and including platform means and control means, said north finding system comprising:

the platform means including a case and a gimbal rotatably supported by the case for being indexed to a plurality of positions;
   means coupled to the gimbal for rotatably driving the gimbal to index said gimbal to the plurality of positions;
   means coupled to the gimbal for locking the gimbal to prevent said gimbal from being rotatably driven and for thereby strapping down the platform means, and for otherwise unlocking said gimbal;
   gyroscope means having an input axis angularly displaced from the horizontal, and coupled to the gimbal for sensing earth's rate when the gimbal is locked and the platform means is strapped down, said gyroscope means thereupon being in a gyrocompassing mode and providing gyrocompassing signals, and for sensing its own rotational displacement when the gimbal is unlocked for being indexed to the plurality of positions and for providing gyroscope rotational displacement signals;
   signal providing means coupled to the gimbal and providing signals corresponding to the tilt of the gyroscope means and signals corresponding to the motion of the ground based equipment when the gyroscope means is in the gyrocompassing mode; and
   the control means including means connected to the gyroscope means and to the signal providing means and responsive to the signals therefrom for compensating for predetermined gyroscope means tilt and ground based equipment base motion parameters, and including means for controlling the means for rotatably driving the gimbal and means for controlling the gimbal locking and unlocking means.

2. A north finding system as described by claim 1, wherein the means coupled to the gimbal for rotatably driving the gimbal to index said gimbal to the plurality of positions includes:
   gimbal driving means coupled to the gimbal;
   energizing means connected to the gimbal driving means;
   the control means providing digital signals for controlling the gimbal driving means for rotatably driving the gimbal; and
   a digital to analog converter connected to the control means and to the energizing means for converting the digital signals to analog signals and for applying said analog signals to the energizing means.

3. A north finding system as described by claim 1, wherein the means coupled to the gimbal for locking and unlocking the gimbal includes:
   a gimbal lock coupled to the gimbal;
   lock drive means connected to the gimbal lock and to the control means and controlled by the control means for activating the gimbal lock to unlock the gimbal, and for de-activating said gimbal lock to lock said gimbal.

4. A north finding system as described by claim 1, including:
   stop means coupled to the gimbal; and
   said stop means being effective for maintaining absolute position alignment between the gimbal and the case.

5. A north finding system as described by claim 2, wherein the means coupled to the gimbal for locking and unlocking the gimbal includes:
   a gimbal lock coupled to the gimbal;
   lock drive means connected to the gimbal lock and to the control means and controlled by the control means for activating the gimbal lock to unlock the pivot, and for de-activating said gimbal lock to lock said gimbal.

6. A north finding system as described by claim 4, wherein the stop means coupled to the gimbal and being effective for maintaining absolute position alignment between the gimbal and the case includes:
   the stop means providing signals corresponding to said absolute position alignment;
   analog to digital converter means for converting the absolute position alignment signals to digital signals, and connected to the control means for applying the digital signals thereto; and
   the control means being responsive to the digital signals applied thereto for applying digital control signals to the digital to analog converter which converts said digital signals to analog signals, said analog signals being applied to the energizing means for controlling said means, and for applying control signals to the gimbal lock for locking and unlocking said gimbal lock.

7. A north finding system as described by claim 1, wherein the gyroscope means coupled to the gimbal for sensing earth's rate when the platform is strapped down, and thereupon being in a gyrocompassing mode and providing gyrocompassing signals, and for sensing its own rotational displacement when the gimbal is unlocked for being indexed to the plurality of positions and for providing gyroscope rotational displacement signals includes:
   a ring laser gyro for providing frequency modulated analog signals corresponding to said earth's rate and to said rotational displacement;
   means connected to the ring laser gyro for processing the frequency modulated analog signals therefrom and for providing corresponding digital signals; and
   the control means including means responsive to the digital signals for providing north reference signals.

8. A north finding system as described by claim 7, including:
   the ring laser gyro providing laser beam intensity signals and dither instantaneous amplitude signals;
   the compensating means included in the control means providing first and second ring laser gyro parameter compensating signals;
   pathlength control means connected to the ring laser gyro and to the control means and responsive to the laser beam intensity signals and the first ring laser gyro parameter compensating signal for controlling the ring laser gyro pathlength; and
   dither control means connected to the ring laser gyro and the control means and responsive to the dither instantaneous amplitude signals and the second ring laser gyro parameter compensating signal for controlling ring laser gyro dither.

9. A north finding system as described by claim 7, including:
   a high voltage power supply; and
   a current regulator connected to the ring laser gyro and to the high voltage power supply for powering the ring laser gyro.

10. A north finding system as described by claim 1, wherein the signal providing means coupled to the gimbal and providing signals corresponding to the tilt of the gyroscope means and signals corresponding to the motion of the ground based equipment when the gyroscope means is in the gyrocompassing mode includes:
   a first accelerometer mounted along a first axis of the platform means and providing a first output;
   a second accelerometer mounted along a second axis of the platform means and providing a second output;
   said first and second axes being orthogonal and defining a plane which is tangential to the earth's surface when the platform means is level;
   means for multiplexing the first and second outputs and for providing an analog multiplexed output;
   means for converting the analog multiplexed output to a digital output; and
   the compensating means included in the control means connected to the first and second accelerometers and responsive to the first and second outputs therefrom for compensating for gyroscope means tilt and ground based equipment base motion parameters.

11. A north finding system of the type mounted to ground based equipment, for providing a north reference for said equipment, and including platform means and control means, said north finding system comprising:
   the platform means including a case and a gimbal rotatably supported by the case for being indexed to a plurality of positions;
   means coupled to the gimbal for rotatably driving the gimbal to index said gimbal to the plurality of positions;
   first signal providing means coupled to the pivot for providing signals corresponding to the absolute position alignment between the gimbal and the case, said first signal providing means including stop means coupled to the pivot, said stop means providing signals corresponding to said absolute position alignment, analog to digital converter means connected to the stop means for converting the absolute position alignment signals to digital signals and connected to the control means for applying the digital signals thereto, and the control means being responsive to the digital signals for controlling the gimbal driving means for rotatably driving the gimbal and for controlling the gimbal locking and unlocking means;
   means coupled to the gimbal for locking the gimbal to prevent said gimbal from being rotatably driven and for thereby strapping down the platform means, and for otherwise unlocking said gimbal;
   gyroscope means having an input axis angularly displaced from the horizontal, and coupled to the gimbal for sensing earth's rate when the platform means is strapped down, and thereupon being in a gyrocompassing mode an providing gyrocompassing signals and for sensing its own rotational displacement when the gimbal is unlocked for being indexed to the plurality of positions and for providing gyroscope rotational displacement signals;
   second signal providing means coupled to the gimbal and providing signals corresponding to the tilt of the gyroscope means and signals corresponding to the motion of the ground based equipment, said second signal providing means including a first accelerometer mounted along a first axis of the platform means and providing a first output, a second accelerometer mounted along a second axis of the platform means and providing a second output, said first and second axes being orthogonal and defining a plane which is tangential to the earth's surface when the platform means is level, means for multiplexing the first and second outputs and for providing an analog multiplexed output, means for converting the analog multiplexed output to a digital output, and the compensating means included in the control means connected to the first and second accelerometers and responsive to the first and second outputs therefrom for compensating for gyroscope means tilt and ground based equipment base motion parameters; and
   the control means including means connected to the gyroscope means and to the first and second signal providing means and responsive to the signals therefrom for compensating for predetermined gyroscope means tilt and ground based equipment base motion parameters, and including means for controlling the means for rotatably driving the gimbal and means for controlling the gimbal locking and unlocking means.

12. A north finding system as described by claim 11, wherein the means coupled to the gimbal for rotatably driving the gimbal to index said gimbal to the plurality of positions includes:
   gimbal driving means coupled to the gimbal;
   energizing means connected to the gimbal driving means;
   the control means providing digital signals for controlling the gimbal driving means for rotatably driving the gimbal; and
   a digital to analog converter connected to the control means and to the energizing means for converting the digital signals to analog signals and for applying said analog signals to the energizing means.

13. A north finding system as described by claim 11, wherein the means coupled to the gimbal for locking and unlocking the gimbal includes:
   a gimbal lock coupled to the gimbal; and
   lock drive means connected to the gimbal lock and to the control means and controlled by the control means for activating the gimbal lock to unlock the gimbal, and for deactivating said gimbal lock to lock said gimbal.

14. A north finding system as described by claim 11, wherein the gyroscope means coupled to the gimbal for sensing earth's rate when the platform is strapped down, and thereupon being in a gyrocompassing mode and providing gyrocompass signals, and for sensing its own rotational displacement when the gimbal is unlocked for being indexed to the plurality of positions and for providing gyroscope rotational displacement signals includes:
   a ring laser gyro for providing frequency modulated analog signals corresponding to earth's rate and to rotational displacement;
   means connected to the ring laser gyro for processing the frequency modulated analog signals therefrom and for providing corresponding digital signals; and
   the control means including means responsive to the digital signals for providing north reference signals.

15. A north finding system as described by claim 14, including:
   the ring laser gyro providing laser beam intensity signals and dither instantaneous amplitude signals;
   the compensating means included in the control means providing first and second ring laser gyro parameter compensating signals;
   pathlength control means connected to the ring laser gyro and to the control means and responsive to the laser beam intensity signals and the first ring laser gyro parameter compensating signal for controlling the ring laser gyro pathlength; and
   dither control means connected to the ring laser gyro and the control means and responsive to the dither instantaneous amplitude signals and the second ring laser gyro parameter compensating signal for controlling ring laser gyro dither.

16. A north finding system as described by claim 14, including:
   a high voltage power supply; and
   a current regulator connected to the ring laser gyro and to the high voltage power supply for powering the ring laser gyro.

* * * * *

UNITED STATES PATENT AND TRADEMARK OFFICE
CERTIFICATE OF CORRECTION

PATENT NO. : 5,060,392
DATED      : October 29, 1991
INVENTOR(S): Mark S. Grasso It is certified that error appears in the above-identified patent and that said Letters Patent is hereby corrected as shown below:

Col. 6, line 52, "=" should read --+-- (second equal sign)

Col. 6, line 61, "wcos" should read --$w_h$cos-- line 61, "=" (second and third equal sign) should read --+--

Col. 7, line 14, "=" (second equal sign) should read --+--

Signed and Sealed this

Second Day of March, 1993

Attest:

STEPHEN G. KUNIN

Attesting Officer           Acting Commissioner of Patents and Trademarks